A. E. LUNDELL.
SELECTIVE CONTROLLING SYSTEM.
APPLICATION FILED OCT. 23, 1915.
1,232,580.
Patented July 10, 1917.
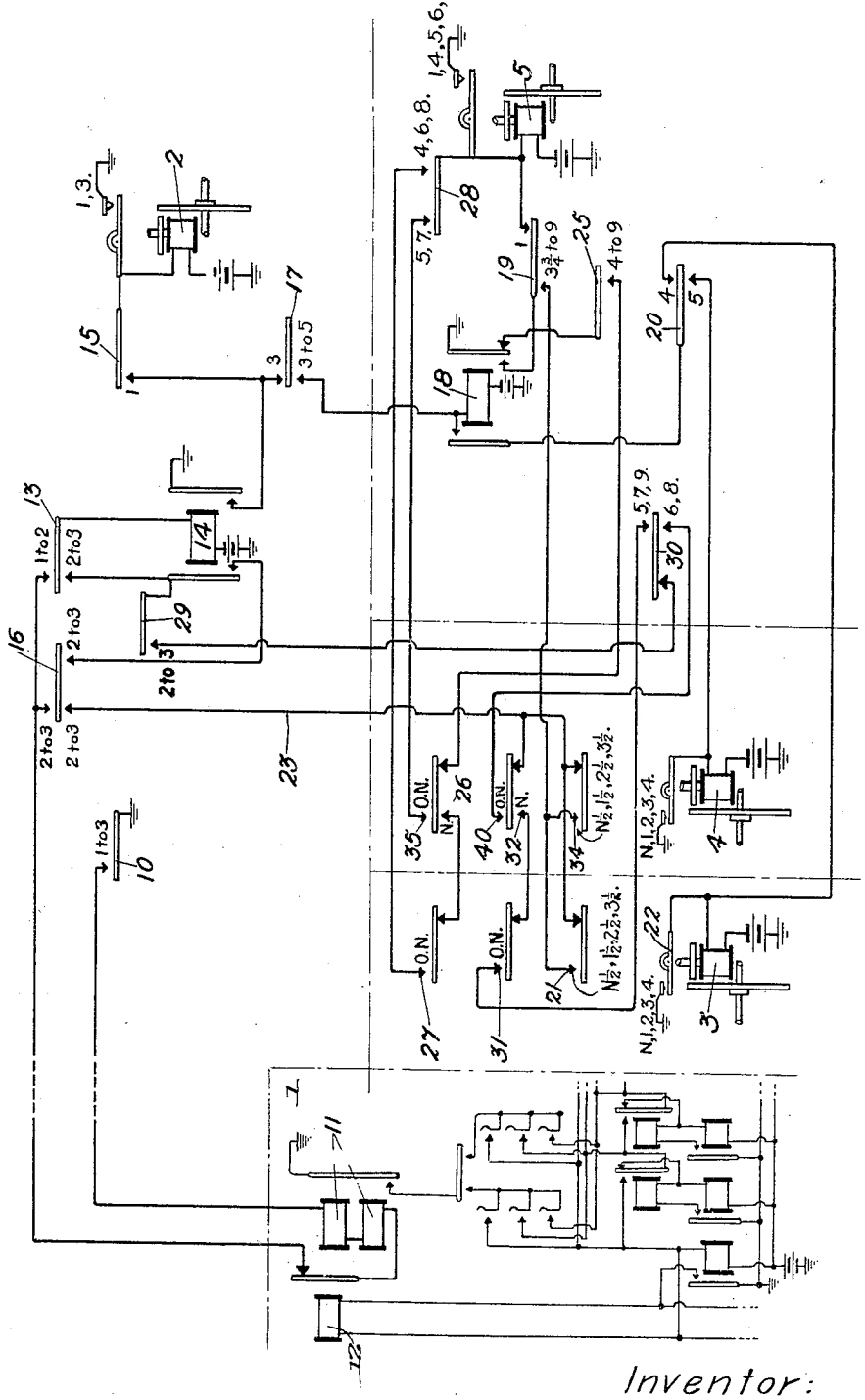
Inventor:
Alben E. Lundell.
by A.C. Hunnel, Atty.

UNITED STATES PATENT OFFICE.

ALBEN E. LUNDELL, OF NEW YORK, N. Y., ASSIGNOR, BY MESNE ASSIGNMENTS, TO WESTERN ELECTRIC COMPANY, INCORPORATED, A CORPORATION OF NEW YORK.

SELECTIVE CONTROLLING SYSTEM.

1,232,580.     Specification of Letters Patent.     Patented July 10, 1917.

Application filed October 23, 1915. Serial No. 57,448.

*To all whom it may concern:*

Be it known that I, ALBEN E. LUNDELL, a citizen of the United States, residing at New York, in the county Bronx and State of New York, have invented certain new and useful Improvements in Selective Controlling Systems, of which the following is a full, clear, concise, and exact description.

This invention relates to selective controlling systems, and more particularly to registering systems for automatic telephone exchanges.

It is the object of this invention to provide a new and simple controlling system in which switches, such as progressively movable number registering switches, are successively associated with a sender.

According to one feature of this invention, an electromagnetic means, such as a relay or a sequence switch, controls the successive association of registers with a sender, the operation of said means being controlled by the registers themselves.

Another feature of this invention calls for a controlling system in which the successive association of the switches with the sender is controlled by an electromagnetic device, this device being under the joint control of said switches and the sender.

Other novel features of this invention will readily appear from the following detail description and the appended claims.

The drawings represent diagrammatically a circuit arrangement for controlling a plurality of registering switches. There is shown a well-known revertive impulse sending mechanism 1; 2 represents a sequence switch associated with a selector employed in the establishment of connections, the sequence switch contacts shown in the upper half of the drawing being controlled by this sequence switch. The sending mechanism is of substantially the same type as the one disclosed in Patent No. 1,168,319 to A. E. Lundell. For the sake of simplicity, only a few counting relays and keys are shown in the drawings of the present application, the keys being shown as connected direct to the counting relays instead of through contacts of registering switches. 3 and 4 are registering switches of the power driven sequence switch type, which may be adjusted in accordance with the set position of sender 1 to register the numerical designation of the called party. The switch contacts shown above switches 3 and 4, are controlled by these switches respectively. 5 is a sequence switch controlling the operation of registering switches 3 and 4 and their successive association with the sender 1, the switch contacts shown in the right-hand bottom corner of the drawings being controlled by this sequence switch.

The invention will be better understood from the following description of the operation.

The operator, desiring to set registers 3 and 4 to a certain position, depresses the required digit keys provided at her sender 1. A circuit is closed thereupon from ground through sequence switch spring 10, the windings of a stepping relay 11, the armature and back contact of a relay 12, the top contact of sequence switch spring 13 and the winding of a relay 14, to grounded battery. Relay 14 becomes energized and by attracting its right-hand armature closes through sequence switch spring 15 a driving circuit for sequence switch 2, causing the movement of this switch out of position 1 into position 3. When sequence switch 2 leaves its second position, the original circuit of relay 14 is opened, but this relay is maintained energized by a locking circuit established from grounded battery, through the winding of this relay, the bottom contact of sequence switch spring 13, the left-hand armature and front contact of relay 14, the right-hand bottom and top contact of sequence switch spring 16 and through the sender to ground at sequence switch spring 10. As soon as sequence switch 2 reaches its third position a circuit is closed from ground through the right-hand armature and front contact of relay 14, the contacts of sequence switch spring 17 and the winding of a relay 18, to grounded battery. This relay becomes energized and by attracting its right-hand armature closes a circuit through the top contact of sequence switch spring 19 for sequence switch 5, whereupon this sequence switch moves out of position 1 into position 4.

The setting of register switch 3 may now proceed in accordance with the set position of sender 1. A circuit is closed from grounded battery through the power magnet of register 3, the top contact of sequence switch spring 20, the left-hand armature and front contact of relay 18, the contacts of sequence switch spring 17 and the right-hand front contact and armature of relay 14, to ground. Under the control of this circuit, register 3 is set into motion. During the movement of the register, contact 21 is closed in all the half positions of this switch, that is to say, midway between the resting positions indicated at the normal spring 22. Thus, when switch 3 reaches position N½, a ground connection is extended through the right-hand armature and front contact of relay 18, the bottom contact of sequence switch spring 19, contact 21, conductor 23, the left-hand contacts of sequence switch spring 16, the back contact and armature of relay 12, the winding of stepping relay 11, and sequence switch spring 10 to ground, causing the shunting of relay 11. Upon each shunting of relay 11 the sender is stepped one step toward its normal position. When the register 3 reaches position 1, the short-circuit is removed from the windings of stepping relay 11, and this relay again becomes energized. The originally traced circuit for the register being still closed, it will be moved out of its first position, causing the sending of ground impulses to sender 1 at each closure of spring 21. After the sender has been stepped in accordance with the selected digit, relay 12 opens at its back contact the circuit of relay 14, which in turn causes the deënergization of relay 18. Upon the deënergization of relay 18 a circuit is closed from ground, through the right-hand armature and back contact of this relay, sequence switch spring 25, contact 26 (closed in the normal position of register 4), contact 27 (closed while register 3 is in an off-normal position), the right-hand contact of sequence switch spring 28, and the power magnet of sequence switch 5 to ground battery. The closure of this circuit causes the movement of sequence switch 5 out of position 4 into position 5. Relay 14 becomes now again energized, a circuit being closed from grounded battery through the winding of this relay, sequence switch springs 13 and 29, the top contact of sequence switch spring 30, the off-normal contact 31 of register 3, the normal contact 32 of register 4, conductors 23, lower and upper contacts of sequence switch spring 16, and through the sender which has been placed in condition for the next set of impulses to ground at sequence switch spring 10. Relay 14 locks up and causes the energization of relay 18 as has been above described. Upon the energization of relay 18 the driving circuit for the registers is again established, the displacement of sequence switch 5 by one position causing the change-over of this circuit from register 3 to register 4 through the bottom contact of sequence switch spring 20. In the same manner as was described in connection with register 3, register 4 causes the closure of contact 34 in all the half positions for sending a ground impulse through conductor 23 to the sender. After the sender has been stepped in accordance with the second selected digit, relay 12 again opens the circuit of relay 14, which in turn causes the reaction of relay 18, whereupon a circuit is closed from ground through the right-hand armature and back contact of this relay, sequence switch spring 25, off-normal contact 35 of register 4 the left-hand contact of sequence switch springs 28, and power magnet of sequence switch 5 to grounded battery for causing the movement of this switch out of position 5 into position 6, in which position another register may be operated under the control of sender 1, relay 14 being again energized by a circuit extending through the bottom contact of sequence switch spring 30 and an off-normal contact 40 of register 4.

Although the invention has been described as applied to registering switches for automatic telephone systems, it will be obvious to those skilled in the art that it is equally well applicable to selectively controlled switches of widely varying character.

What is claimed is:

1. In combination with a variably adjustable sender, a switch operable in accordance with the adjustment of said sender, and electromagnetic means for associating said switch with said sender, of means controlled by said switch for operating said electromagnetic means.

2. In combination with a variably adjustable sender, a plurality of switches operable in accordance with the adjustment of said sender, and electromagnetic means for successively associating said switches with the sender, of means jointly controlled by said switches for operating said electromagnetic means.

3. In combination with a variably adjustable sender, a plurality of switches operable in accordance with the adjustment of said sender, and electromagnetic means for successively associating said switches with said sender, of means jointly controlled by said switches and the sender for operating said electromagnetic means.

4. In a selective controlling system, a circuit, a sender associated with one end and a relay associated with the other end of said circuit, a switch operable in accordance with the adjustment of said sender, means controlled by said relay for associating said switch with said circuit, and means controlled by said switch for operating said relay.

5. In a selective controlling system, a circuit, a sender associated with said circuit, a plurality of variably operable switches, electromagnetic means for controlling the successive association of said switches with said circuit, and means jointly controlled by said switches and the sender for operating said electromagnetic means.

6. In a selective controlling system, a circuit, a sender associated with one end and a relay associated with the other end of said circuit, a switch operable in accordance with the adjustment of said sender, means controlled by said relay for associating said switch with said circuit, and means controlled by said switch for maintaining said relay actuated during the complete setting of said switch.

7. In a selective controlling system, a circuit, a sender associated with one end and a relay associated with the other end of said circuit, a plurality of switches operable in accordance with the adjustment of said sender, means controlled by said relay for successively associating said switches with said circuit, and means controlled by two of said switches for maintaining said relay actuated during the complete setting of one of said switches.

8. In a selective controlling system, a plurality of selectively operable switches, a circuit, a sender associated with one end and a relay associated with the other end of said circuit, means controlled by said relay for successively associating said switches with the circuit, and contacts at said switches and at said sender for controlling the operation of said relay.

9. In a selective controlling system, a variably operable sender, a plurality of switches adapted to be set under the control of said sender, electromagnetic means for successively associating said switches with the sender, and means controlled by said switches for operating said electromagnetic means upon the actuation of one of said switches.

10. In a selective controlling system, a variably operable sender, a plurality of switches adapted to be set under the control of said sender, electromagnetic means for associating one switch after the other with said sender, and means controlled by the last set switch for operating said electromagnetic means.

11. In a selective controlling system, a variably adjustable sender, a switch operable in accordance with the adjustment of said sender, electromagnetic means for associating said switch with said sender, a circuit for said electromagnetic means including a contact controlled by said switch, and means for closing said circuit in response to the completion of the operation of said sender.

In witness whereof, I hereunto subscribe my name this 20th day of October A. D., 1915.

ALBEN E. LUNDELL.

Copies of this patent may be obtained for five cents each, by addressing the "Commissioner of Patents, Washington, D. C."